Jan. 30, 1962 W. B. MINTON ET AL 3,018,615
AUTOMATIC CANCELLING OR RE-SETTING PARKING METER UNIT
Filed Sept. 26, 1957 3 Sheets-Sheet 1
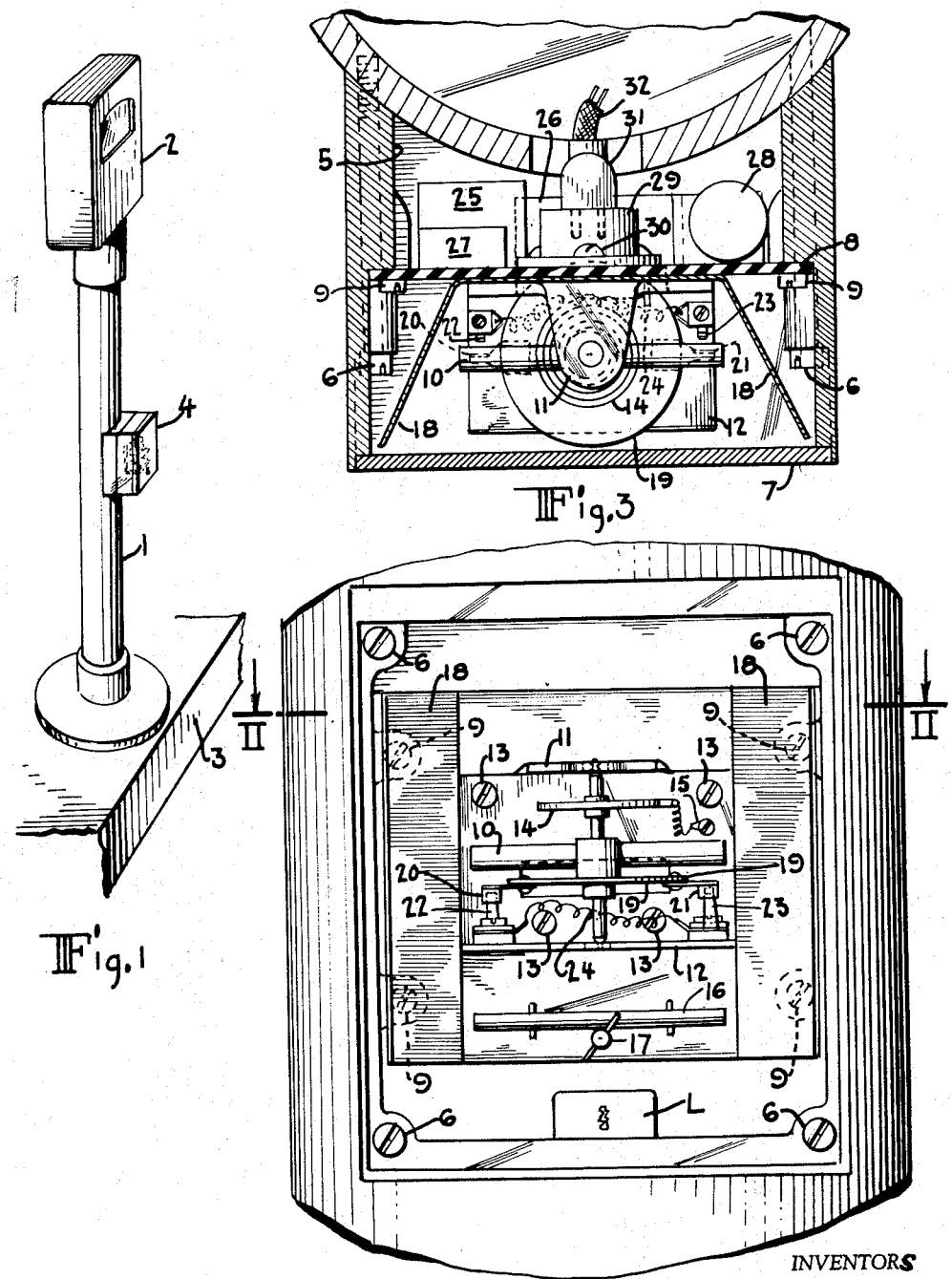
INVENTORS
Warren B. Minton
George W. Bryan
Harry J. Van Gorden
by Bray Seward
their attorneys

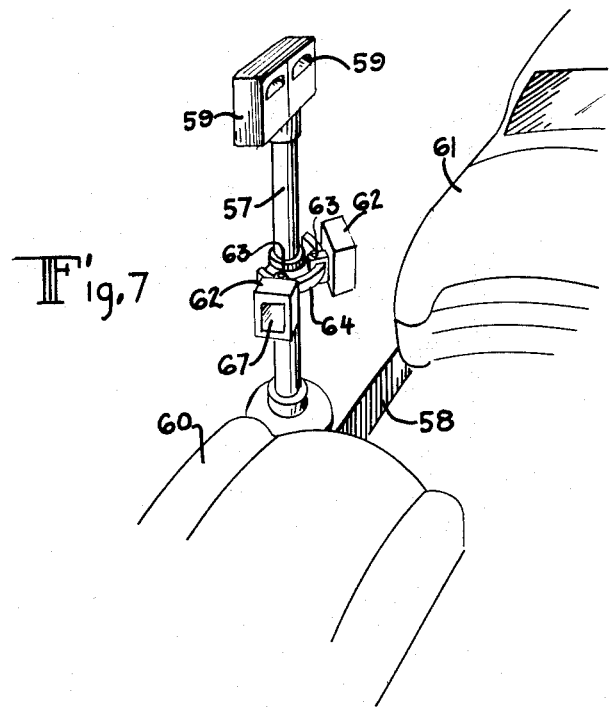
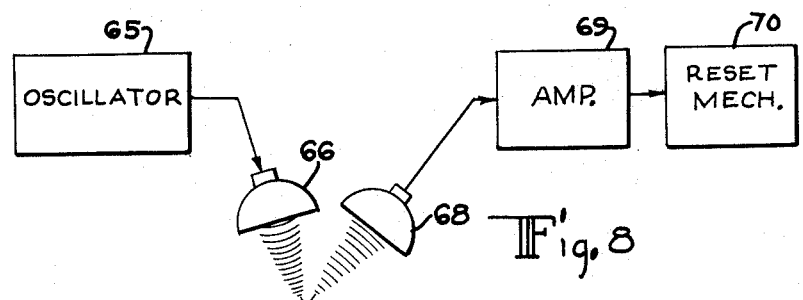
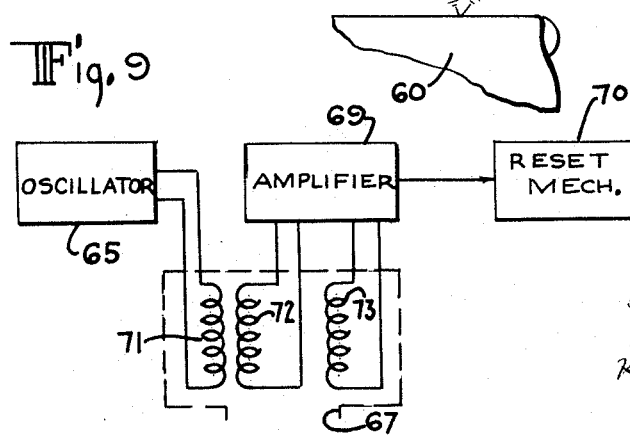

Jan. 30, 1962  W. B. MINTON ET AL  3,018,615
AUTOMATIC CANCELLING OR RE-SETTING PARKING METER UNIT
Filed Sept. 26, 1957  3 Sheets-Sheet 3

INVENTORS
Warren B. Minton
George W. Bryan
Harry J. Van Gorden
by their attorneys

United States Patent Office 3,018,615
Patented Jan. 30, 1962

3,018,615
AUTOMATIC CANCELLING OR RE-SETTING
PARKING METER UNIT
Warren B. Minton, Shrewsbury, George W. Bryan, Belmar, and Harry J. Van Gorden, Manasquan, N.J., assignors to Time Stop, Inc., Newark, N.J., a corporation of New Jersey
Filed Sept. 26, 1957, Ser. No. 686,329
4 Claims. (Cl. 58—142)

This invention relates to an automatic cancelling or re-setting parking meter unit, and has for an object to provide such a device which magnetically or electronically detects and is activated by both the presence and absence of a vehicle in the assigned parking space, so that, the presence thereof immediately causes the meter timing pointer, or the like, to assume zero position, and, when followed by the depositing in the meter of the required coin with the necessary manual activation of a crank, or the like, initiates the measuring in time of the vehicle's stay; while the departure of the vehicle causes the operative parts to re-assume positions for actuation by the presence of a subsequent vehicle; thus enabling the municipality which has installed the meters to receive revenue for the full stay of all vehicles in the parking spaces.

Another object is to provide such a device which may be employed in duplicate on a single meter stanchion and govern, as just described, the designated parking spaces on both sides of the stanchion without interference by either device with the functioning of the other.

Another object is to provide such a device which performs its function equally well regardless of the parking arrangement locally in force, e.g., parallel or angular.

Another object is to provide such a device which is adjustable so as to project its magnetic or electronic field or force a distance adequate for cooperative functioning with the presence or absence of a vehicle in the designated parking space but not far enough to be subject to effects of passing traffic in the roadway; and which is also shielded from effects of side walk traffic.

Another object is to provide such a device which is adaptable to any and all of the various types of meters and meter stanchions in present use, and which may be adjustably affixed to the stanchion.

A further object is to provide certain improvements in the form, construction, arrangement and material of the several parts, whereby the above named, and other objects inherent in the invention, may be efficiently attained.

In brief summary, the invention comprehends a device or unit which may be conveniently attached to a parking meter stanchion of any type now in use, and be connected electrically to the clock mechanism, or the like, which times the stay of vehicles in the parking space after the requisite coin has been deposited in the meter, the device or unit being sensitive to the presence and absence of a vehicle in the space so that when a vehicle has entered the space, the device or unit is affected and the timing meter, through the above named connection, at once reads zero thus, therefore, requiring the deposit of an additional coin before initiating another timing period. Thus, payment is necessary for the whole stay of every vehicle that occupies the parking space, and loss of revenue through enjoyment of free time by a vehicle which takes the place of one that has departed before expiration of the time period alloted to a certain coin is avoided. In one form of the invention, the device or unit operates through a magnetic field projected into the parking space and affected by the metal, e.g. front portion, of the vehicle while not being affected by traffic in the roadway or on the side walk. In another form the invention employs an electronic field and, in this form, a plurality of devices or units may be attached to a single meter stanchion to serve with respect to vehicles parked on either or both sides of the stanchion, thus promoting substantial economy in the number of stanchions needed for a given area. Nothing causing any change in the roadway, side walk, or curb, is demanded for the functioning of the device or unit, in either form of the invention, as mere attachment to the meter stanchion and electric connection to the meter mechanism fully suffices.

Practical embodiments of the invention are shown in the accompanying drawings in which:

FIG. 1 represents, in perspective, a conventional parking meter on its stanchion mounted on a curb, with the device or unit attached to the stanchion;

FIG. 2 represents, on an enlarged scale, a front elevation of the device or unit, showing its operating mechanism;

FIG. 3 represents a horizontal section taken in the plane II—II of FIG. 2, looking in the direction of the arrows, and showing the means of attaching the device or unit to the stanchion;

Figure 4:
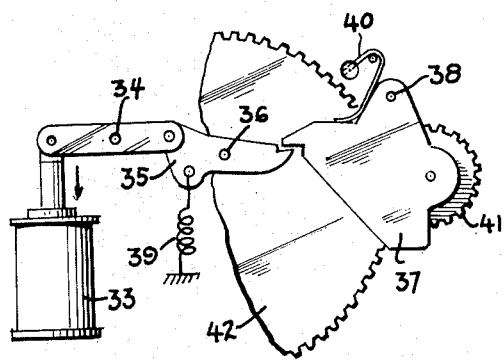
FIG. 4 represents an enlarged detail elevation, partly broken, showing the operative connection between the device or unit and the parking meter.

FIG. 7 represents, in perspective, a pair of conventional parking meters on their stanchion mounted on a curb, with a pair of the devices or units of the electronic form of the invention adjustably attached to the stanchion for cooperation with two vehicles, partly shown, parked at opposite sides of the stanchion; and FIGS. 8 and 9 represent, diagrammatically or schematically, the operating parts of the electronic activator of the device or unit which, in this form of the invention, is substituted for the magnetic activator of the form shown in FIGS. 1–6.

Referring now to the form of the invention illustrated in FIGS. 1 through 4, a parking meter stanchion, which may be of any suitable form as it constitutes no part, per se, of this invention, is designated by 1, and it carries at its top a parking meter 2 which may be of any type now in use. The stanchion is shown as mounted on a sidewalk curb 3, as is usual. The device or unit forming the subject matter of this invention is denoted generally by 4, and may be secured to the stanchion in any appropriate manner.

The operating mechcanism of the device or unit is enclosed within a case or jacket which may be composed of any suitable material not subject to weather conditions nor liable to affect the functioning, aluminum being a preferred substance. This case comprises an inner part 5 that may be secured to the stanchion by screws 6; and a cover 7 which slips over the part 5 by a horizontal motion and may be held against unintentional removal by a lock L, of any preferred kind, which it is deemed unnecessary to show or describe in detail.

To the front of the inner part 5 of the case is fixed a plate 8 of insulating material which serves as a support or carrier for the operating elements of the unit, the plate being firmly secured in position as by screws 9.

A permanent magnet, preferably of the bar type, is denoted by 10, and is pivotally mounted to swing in a horizontal plane in a bracket having upper and lower projections 11, 12, which bracket is rigidly affixed to the plate 8 by screws 13. A balance spring 14 for normally yieldingly holding the bar magnet in neutral position is fast on the magnet pivot and is electrically connected by a wire to a screw stud 15 set in the plate 8. There are desirably included east-west and north-south compensating magnets which are indicated by 16 and 17, respectively, and are mounted below the bracket 11, 12 in a protecting and focusing shield 18 that will be hereinafter described.

Fixed to the pivot of magnet 10, and below the latter, is a rotatable switch 19, which carries contacting fingers 20, 21, adapted to establish electric connection with fixed contacts 22 and 23, that are screwed onto the lower projection 12 of the bracket and are interconnected by a wire 24; whereby rotary movement of the magnet 10 in either direction will complete electric connection with the contacts 22 and 23. The contacts are insulated from the bracket.

A first condenser 25 is suitably secured to the back of plate 8 and it may, for example, be of one hundred micro farad capacity; while a second condenser 26, of much greater capacity, is likewise fixed to the same side of the plate. There is also a resistor 27 of say, fifty thousand to one hundred thousand ohm resistance, and a relay 28 which is satisfactorily of the midget type having about three hundred ohm resistance in a six volt direct current circuit; the said resistor and relay being likewise suitably affixed to the rear of plate 8 for connection in the electric circuit as will be hereinafter described.

Also mounted on the rear of plate 8 and in electric connection therewith is a plug-in socket 29 fastened by screws, one of which is shown and marked 30; in which socket is shown a plug 31 having a wire lead 32 that is designed to make current contact with a solenoid that is housed in the parking meter 4 and mechanically connected with tripping mechanism for re-setting the meter to zero reading whenever the solenoid is energized. This last named arrangement is represented in FIG. 4, wherein the solenoid is denoted by 33, and is pinned to one end of a rocking lever that is pivoted at 34 and has its other end pinned to one end of a trip release 35 which is pivoted at 36, and has its nose in operative contact with a nose on the timing drive gear carrier 37 that, in turn, is pivoted at 38. A spring 39 normally urges the nose on release 35 upwardly against the pull of the solenoid, while a spring 40 normally urges the gear carrier to the right in FIG. 4. The timing drive gear itself is marked 41, while the gear for controlling the indicator arm or pointer of the meter is given the number 42.

The parts just described may be regarded as illustrating conventional mechanism of a parking meter which is pertinent to the present invention, and the operation thereof may be briefly explained as follows:

When the solenoid 33 is energized, it pulls its end of the rocking lever downwardly, as indicated by the arrow. This motion lowers the nose of release 35 and permits spring 40 to swing gear carrier 37 on its pivot and unmesh gears 41 and 42, thereby allowing the indicator arm or pointer of the meter to return to zero reading, as is well understood by those familiar with such devices. De-energizing of the solenoid enables spring 39 to return the parts to the positions shown in FIG. 4, with the gears 41 and 42 in driving mesh.

The hereinabove mentioned protecting and focusing shield 18 is of truncated cone shape in horizontal cross-section, as well shown in FIG. 3, thus providing it with a flat rear portion that is secured to the front of plate 8 by the screws 13 that fasten the bracket 11, 12, in place, and also providing flaring wings which encompass the magnet 10 and its associated parts that are in front of plate 8. The shield is in sheet formation and is composed of Mumetal or its substantial equivalent, e.g. Permalloy. Thus the shield is capable of protecting the magnet 10 from otherwise disturbing influences in the side walk traffic while also focusing the magnetic field of the device or unit itself toward a desired portion of the assigned parking space, preferably that portion intended to be occupied by the hood, with the enclosed engine, of each vehicle which is desirable because of the bulk of metal within the hood.

It is characteristic of the material of which the shield is composed that it will not partake of appreciable residual magnetism after exposure to a magnetic field and that it will function to keep stray side fields from acting upon the operative field created by the magnet 10.

Figure 6:
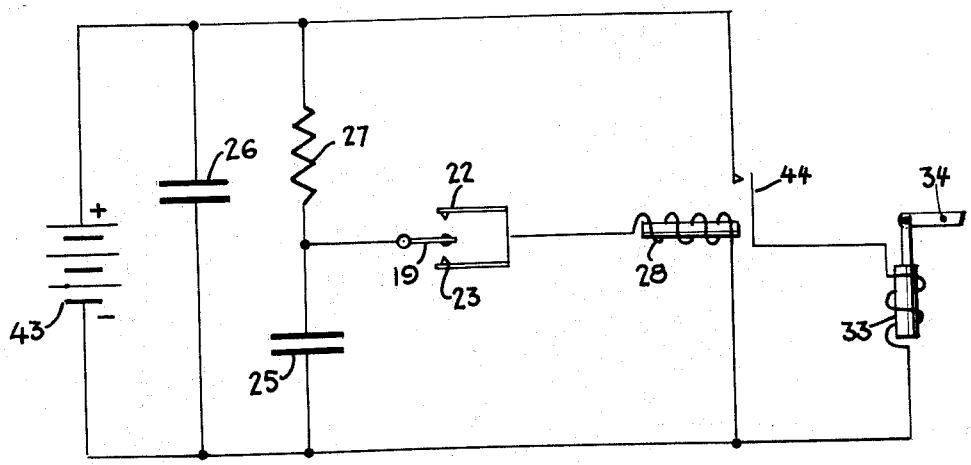
FIG. 6 represents a diagrammatic or schematic layout of the operating mechanism of the device or unit.

The operation of the invention is diagrammatically or schematically illustrated in FIG. 6, in which a source of electric current is marked 43, and preferably consists of small compact dry batteries, e.g., hearing aid type mercury cells capable of supplying a six volt direct current. This source of current is properly electrically connected by wires, as shown, with previously described elements, i.e., the condenser of large capacity 26, the condenser of smaller capacity 25, the resistor 27, the switch 19 of the magnet 10 with its contacting fingers 20 and 21, the fixed contacts 22 and 23, the relay 28, and the solenoid 33, which latter, as set forth above, is mechanically connected to a rocking lever in the tripping mechanism of the parking meter which lever is pivoted at 34.

When the parking space is unoccupied the parts are in the neutral position indicated in FIG. 6. The entry of a vehicle will disturb the magnetic field generated by magnet 10 and focused by shield 18, causing the magnet to swing in a horizontal plane and bring one of the fingers 20 or 21 of switch 19 against one of the fixed contacts 22 or 23. It is immaterial in which direction the magnet and its switch rotate because contact will be made in either event. This meeting of the switch and one of the fixed contacts causes the condenser 25, which has been charged by the source of current 43 while the elements were in neutral position shown in FIG. 6, to at once discharge through the coil of relay 28, close the relay switch 44, and actuate the solenoid 33 which operates the tripping or re-set mechanism of the parking meter, as explained above in connection with the description of FIG. 4. The meter is now at zero reading and, until the deposit of the required coin and, usually if not always, some accompanying manual operation such as the turning of a crank, presents a visual indication of a violation. Upon performance of the just named requirements, the violation disappears and the timer of the meter begins to show progressively the consumption of the alloted time.

It should be noted that the solenoid 33 actually draws upon the condenser 26, which is of large capacity, e.g., one thousand micro farad in a six volt circuit, to fire or actuate itself, rather than upon the source of current 43, while the condenser 25, of lesser capacity, charges through the resistor 27 from the current source 43. This permits the use of small and compact batteries that suffice for long life even though high current drains are entailed in operation for extremely short periods, e.g. one thousandth of a second. The importance of this feature is enhanced in cold temperatures which tend to increase the internal resistance of the dry batteries. The charge of condenser 26, is re-established when the relay 28 has completed its closure cycle.

The switch 19 of magnet 10 remains closed while the vehicle is in the parking space, but the resistor 27 insures that the current drain upon the source is so slight as not to exceed approximately the loss during shelf life of batteries. Immediately upon departure of the vehicle, the field of magnet 10 is no longer disturbed and the parts at once return to the neutral position shown in FIG. 6. The relay and solenoid are active only for the time of discharge of the condensers 25 and 26, respectively, i.e., for less than one tenth of a second in each case; and the relay will not be activated again until the switch 19 and contacts 22, 23, are open. While these switch contacts are closed the current drain is, as above indicated, slight due to the high voltage drop across resistor 27 which prevents the relay 28 from being again closed until its condenser 25 is re-charged.

The magnetic field generated by magnet 10 is suited to the parking space so that passing road traffic will not normally disturb it, but, should an occasional disturbance occur while the space is occupied, the operation of the timing meter will not be defeated because the switch 19 of the magnet is closed. If such a disturbance occurs while the parking space is vacant, the only result will be the resetting or cancelling of the meter as takes place when a vehicle enters the space.

From the foregoing it is believed to be clear that the parking of every vehicle promptly causes the meter indicator to read zero regardless of the condition of the meter, so that it is not possible for any vehicle to be parked on what may be termed "free time."

Figure 5:
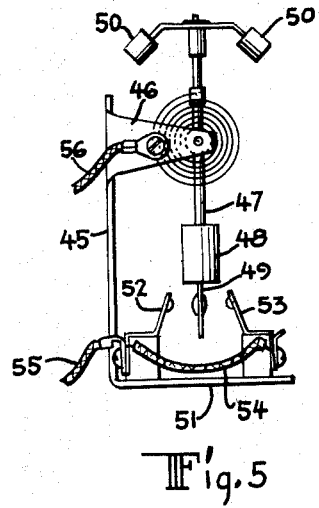
FIG. 5 represents, on a smaller scale, a modification of the parts shown in FIGS. 2 and 3; the magnet of FIG. 5 being arranged to operate in a vertical plane as contrasted with the horizontally operating magnet of FIGS. 2 and 3.

The modification represented in FIG. 5, concerns only the magnet and switch arrangement, which differs from the form of FIGS. 1–4 essentially in that the magnet oscillates or swings in a vertical rather than a horizontal plane. Here the parts are carried by a bracket which has an upright back 45 that may be screwed to plate 8 in a manner similar to the bracket 11, 12. From the upper part of the said bracket a pair of arms project laterally, one being shown and marked 46, and between them is pivotally swung a stem 47 which carries at its lower end a permanent magnet 48, and its double faced contact finger 49. A balancing or neutralizing spring interconnects the stem 47 and the arms 46 for normally holding the magnet against swinging, while a pair of counter weights 50, 50, carried at the top of the stem, steady the motion of the magnet. The bracket has a lower foot portion 51 on which are fastened insulated fixed contacts 52 and 53, positioned for operative contact with the finger 49 of the magnet, and the said contacts are electrically connected by a wire 54. An extension 55 of wire 54 leads to the relay 28, while another wire 56 leads from an arm 46 to the condensers 25, 26, the resistor 27, and the source of current 43.

The operation of this modification is the same as the form of FIGS. 2 and 3, except that disturbance of the field of magnet 48 causes it to swing in a vertical plane in place of the horizontal rotary motion of magnet 10. For correct operation of this modification the stanchion 1 should be accurately vertical.

It should be emphasized that the device or unit of this invention provides for long service though fed by an extremely small source of current; indeed, the total requirements hardly exceed the normal dissipation of power to which dry batteries, e.g. hearing aid type mercury cells, are subjected while on a store shelf; thus supplying a low cost, small and compact arrangement requiring a minimum of maintenance labor and expense, as well as one that readily adapts itself to all usual parking meter systems.

Some municipalities have adopted, in whole or in part, systems in which a single stanchion supports a pair of meters in order to serve vehicles parked in designated spaces on both sides of the stanchion and, while a pair of the magnetic devices or units heretofore described could be fitted for adaptation to such systems, certain factors, chiefly relating to procurement of desirable material, expense, and satisfactory shielding to prevent interferences by the magnetic fields of a pair of such units, have led to the conception and development of the form of the invention shown in FIGS. 7–9, which may be denominated as electronic devices or units.

As this form of the invention bears a general similarity to the forms already described, the following details will be directed to the differences, and the parts which remain unchanged will receive only general mention though different numerals will be applied in order to avoid the possibility of confusion.

Turning to FIG. 7, the stanchion is here denoted by 57, mounted, as usual, on a curb 58, and it will be observed that it carries at its top a pair of parking meters 59, 59, designed to register the occupancy time of two vehicles which are partially shown at 60 and 61 in parking spaces at each side of the stanchion.

The device or unit, embodying the invention in this modification, is contained within a case, as in the previous description, and a pair of the units fitted for cooperation with the meters 59, 59, are shown at 62, 62. They are adjustably secured, as by set screw clamps 63, 63, on an arcuate support 64 suitably fastened to the stanchion below the meters, which enables each unit to be correctly directed or faced with respect to the spaces they govern and, hence, with respect to vehicles occupying the spaces.

In this system, the magnets 10 and 48, with their immediately associated parts, and the shield 18, are omitted and, in their place, the following recited elements are suitably fastened to the plate 8 of each unit. An oscillator 65, adapted to operate in ranges of frequencies higher than the audible range, is electrically connected to a transmitting transducer 66 which serves to transform the vibratory output of the oscillator into compressional wave energy without altering the frequency, and these waves are directed to flow toward the alloted parking spaces by the adjustment of the cases of the pair of units 62, 62, on the arcuate support 64, as above explained; the case of each unit being provided with a directional window, preferably of plastic, one being shown and marked 67.

When a vehicle enters either parking space, the beam of wave energy from the unit governing that space impinges upon the vehicle and is reflected at the same angle as that of impingement, as indicated in FIG. 8. The reflected waves are accepted by a receiving transducer 68, and translated by the latter into wave energy which is conducted to and amplified by an amplifier 69, which is in electrical connection with the relay 28 (see FIG. 6) and entails actuation of the solenoid 33 and the means for cancelling or re-setting to zero of the parking meter 59 with which the unit 62 in question is in operative connection, while the deposit of the specified coin re-starts the meter in timing operation, all as previously explained in describing the magnetic form of the invention illustrated in FIGS. 1–6. The cancelling or re-setting means is diagrammatically shown in FIGS. 8 and 9, and denoted by 70. The departure of the vehicle from the parking space or stall immediately terminates the reflection of the wave beam and permits the parts to return to normal positions.

The field of sensitivity of this device or unit may be controlled in length by suitably adjusting the output level of the oscillator, while the width of the beam of wave energy is limited by the directional window 67, since compression waves at frequencies higher than fifteen kilocycles do not spread after passing through a directional aperture. Thus the operation is not disturbed by passing road traffic.

The oscillator, transmitting transducer, receiving transducer, and amplifier, may all be of any well known and approved form, and are deemed to require no detailed description; but it should be remarked that the electronic means preferably employs transistors instead of vacuum tubes for the purpose of functioning with a notable minimum need of power.

Among the advantages of this form of the invention are the absence of moving parts, extremely small power requirement, long life, economy, and minimum maintenance.

The foregoing description, of course, applies equally well to both of the units 62, 62.

FIG. 9 represents an arrangement which is slightly modified from that of FIG. 8 in that the oscillator 65, which is adapted to operate at a frequency of about twenty-five kc. feeds a transmitting coil 71 which is operatively integrated or suitably connected via mutual inductance with a pair of receiving coils 72, 73, which latter are so arranged with respect to the transmitting coil 71 that they are balanced electrically to zero by the transmitting coil when no vehicle is present in the parking space governed by the unit. The entrance of a vehicle into the said space causes the field established by the oscillator to be distorted resulting in imbalance of the receiving coils, the ensuing output of the latter being amplified by 69 so as to operate the reset mechanism as heretofore described. As the operation of this slight modification of FIG. 9 is the same as that already described of FIG. 8, it is regarded as unnecessary to restate the same.

Referring back to the form of the invention represented in FIGS. 1 through 4, as well as the modification of FIG. 5, and the schematic showing of FIG. 6, it may be noted that the device or unit may be so adjusted as to reset the meter to zero by either the entrance into or the departure of a vehicle from the allotted parking space. In order that this function may be performed by the entrance of a vehicle, the switch 19 is so oriented as to be in an open or neutral position when the parking space is unoccupied. While in this position the condenser 25 becomes charged. Upon the entrance of a vehicle into the parking space, the magnetic field is so affected that the switch 19 makes contact with one or the other of the fixed contacts 22, 23, whereupon the charge of condenser 25 acts upon the coil of relay 28 and causes closure of contact 44. The condenser 26, of larger capacity, which is already charged, supplies power when the relay closes to the solenoid 33 which resets the meter to zero as previously described. Departure of the vehicle from the parking space returns the switch mechanism to the neutral position exhibited in FIG. 6 and allows both condensers to recharge so that the system is ready for the just described actuation upon the entrance of a succeeding vehicle. The recharging of the condensers does not require more than approximately 20 seconds. In order to arrange the system so that the parking meter is reset to zero by the departure or exit of a vehicle from the parking space, rather than by its entrance thereinto, the switch 19 is so oriented as to be in a closed position with respect to either fixed contact 22 or 23 while the parking space is vacant. In this position of the parts, the current which passes through resistor 27 is so feeble that it will not actuate the relay 28. However, the entrance of a vehicle into the allotted space will so affect the magnetic field that the switch opens and permits the charging of both condensers 25 and 26. Then, when the vehicle departs, the switch closes with one or the other of the fixed contacts, and permits the condensers to feed their charge through the relay to the solenoid, as described above, which results in the resetting of the parking meter to zero reading.

Practical operation of the device or unit has disclosed that it is advantageous to so orient the switch 19 and fixed contacts 22, 23, in relation to the physical positions of the poles of the magnet that the balance spring 14 may be omitted, because the optimum positioning of the magnetic element may be obtained through the effect of the compensating magnets 16 and 17 alone. In this manner the mass of the vehicle in the parking space is used to good advantage.

Touching again upon the showing of FIG. 4, which has been set forth as illustrating conventional mechanism of a parking meter, it may be pertinent to add that this type of parking meter utilizes a clock motor with a drive gear adapted to mesh with a sectional gear on the end of an indicating arm or pointer. When a coin is deposited in this type of meter, a crank may be turned to set the indicator at zero with the drive gear 41 and the indicator controlling gear 42 in mesh to wind the timing clock. If the indicator arm or pointer is spring loaded to urge it toward zero reading, the throwing of gear 41 out of mesh with 42 through action of solenoid 33 will permit the meter to be reset to zero, and this action is very quick. When, again, a coin is inserted into the meter, the subsequent turning of the crank actuates the mechanism which causes gear 41 to re-mesh with 42, which returns the nose on timing drive gear carrier 37 to the operative position shown in FIG. 4, which position is retained until the solenoid is actuated.

With reference to all forms of the invention, it is believed evident that the objects recited at the outset of this specification are admirably attained, and we desire it to be understood that various changes may be resorted to in the form, construction, arrangement, and material of the several parts without departing from the spirit or scope of the invention and, hence, that we do not intend to be limited to details herein shown or described except as the same may be included in the claims or be required by disclosures of the prior art.

What we claim is:

1. An automatic re-setting unit attachable to a parking meter having a timing mechanism provided with a zero reset device, said unit comprising a magnetic switching element operatively sensitive to the presence of a vehicle in the parking space assigned to the meter to cause a switching action upon the movement of a vehicle relative to said parking space, shielding means formed of a material which blocks magnetic fields and being disposed relative to said magnetic switching element to direct the field thereof toward said parking space whereby said element is unaffected by traffic in the adjacent areas, said material having a relatively high permeability and a low residual magnetism, and electrical means operatively coupled to said element and responsive to said switching action to actuate said reset device to zero set said meter upon the entry and exit of a vehicle into and from said parking space, said electric connecting means including a source of electric current, a condenser of large capacity, a condenser of smaller capacity, a resistor, a relay, and a solenoid, all in circuit, and subject to being operated by movement of the magnet when the latter is activated by the presence of a vehicle in said parking space.

2. A device as defined in claim 1, in which the circuit that interconnects the recited elements adapts the condenser of smaller capacity to operate the relay, the condenser of large capacity to fire the solenoid, the condenser of smaller capacity to be charged and re-charged from the current source through the resistor, and the condenser of large capacity to be charged and re-charged directly from the source of current.

3. An automatic re-setting unit attachable to a parking meter having a timing mechanism provided with a zero reset device, said unit comprising a magnetic switching element operatively sensitive to the presence of a vehicle in the parking space assigned to the meter to cause a switching action upon the movement of a vehicle relative to said parking space, shielding means formed of a material which blocks magnetic fields and being disposed relative to said magnetic switching element to direct the field thereof toward said parking space whereby said element is unaffected by traffic in the adjacent areas, said material having a relatively high permeability and a low residual magnetism, and electrical means operatively coupled to said element and responsive to said switching action to actuate said reset device to zero set said meter upon the entry and exit of a vehicle in and from said parking space, said electrical means including a voltage source, a first capacitor of relatively large value connected across said source and changeable thereby, a second and smaller capacitor, a resistor connected in series with said second capacitor across said first capacitor, a relay connected through said magnetic switching element across said second capacitor whereby said relay is actuated upon the occurrence of said switching action, said relay being provided with a normally open switch which is closed upon relay actuation, and solenoid means operatively coupled to said reset device and connected through said switch to said voltage source to be energized thereby such that said reset device is operated by said solenoid upon occurrence of said switching action.

4. A unit, as set forth in claim 3, further including means mounting said element for oscillation in the horizontal plane.

References Cited in the file of this patent

UNITED STATES PATENTS

| | | |
|---|---|---|
| 2,034,616 | Gossler | Mar. 17, 1936 |
| 2,096,916 | Pook | Oct. 26, 1937 |
| 2,155,712 | Hull | Apr. 25, 1939 |
| 2,178,315 | Sweetland | Oct. 31, 1939 |
| 2,189,597 | Wells | Feb. 6, 1940 |
| 2,251,407 | Johns | Aug. 5, 1941 |
| 2,488,710 | Cooper | Nov. 22, 1949 |
| 2,535,472 | Wood | Dec. 26, 1950 |
| 2,575,650 | Alexander | Nov. 20, 1951 |
| 2,623,933 | Allstadt | Dec. 30, 1952 |
| 2,652,551 | Gumpertz et al. | Sept. 15, 1953 |
| 2,656,908 | Ellison | Oct. 27, 1953 |
| 2,681,960 | Ellison | June 22, 1954 |

FOREIGN PATENTS

| | | |
|---|---|---|
| 323 | Great Britain | Feb. 19, 1858 |
| 1,550 | Great Britain | Apr. 9, 1881 |
| 4,259 | Great Britain | Nov. 7, 1818 |

OTHER REFERENCES

Radio and Television News, December 1955, pages 48, 49, 108, 109, "Shielding in Hi-Fi Equipment" by W. Philbrook.